T. P. Spencer.
Packing Case for Perfumery.

Nº 105,269.          Patented Jul. 12, 1870.

Witnesses:
A. Bennewendorf
Alex. H. Roberts

Inventor;
T. P. Spencer
PER Munn & Co
Attorney

United States Patent Office.

THOMAS P. SPENCER, OF JERSEY CITY, NEW JERSEY.

Letters Patent No. 105,269, dated July 12, 1870; antedated June 28, 1870.

IMPROVED PACKING-CASE FOR PERFUMERY, &c.

The Schedule referred to in these Letters Patent and making part of the same

*To all whom it may concern:*

Be it known that I, THOMAS P. SPENCER, of Jersey City, in the county of Hudson and State of New Jersey, have invented a new and useful Improved Packing-Case for Perfumery, &c.; and I do hereby declare that the following is a full, clear, and exact description thereof, which will enable others skilled in the art to make and use the same, reference being had to the accompanying drawing forming part of this specification.

This invention relates to improvements in small packing-cases or boxes for putting up small bottles of perfumery and other toilet-articles for market, and consists of a paper, wood, or other circular box, with separate compartments for each bottle, with large oval or other holes through the periphery, one to each compartment, and a deep cover closing down to the bottom of the box, also provided with holes, which, when properly adjusted on the box, will coincide with the holes through the latter, so that the purchaser may, by turning the cover on the box, see the labels on the bottles, which are usually packed snugly, without removing them one by one, as is now required.

The said openings are closed by turning the cover on the box, and, when so closed, the openings through the cover expose to view pictures on the box.

Similar letters of reference indicate corresponding parts.

Figure 1:
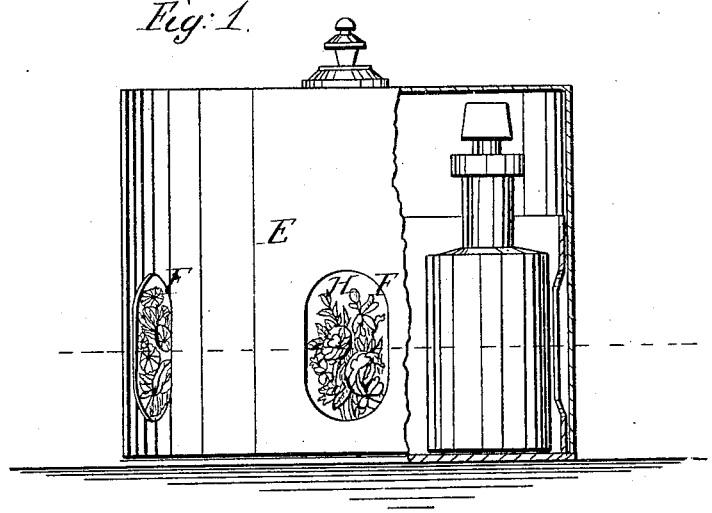
Figure 1 is an elevation, partly broken out, of my improved packing-case.
Figure 2:
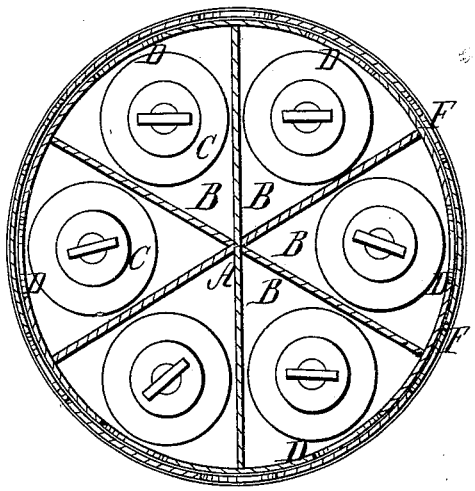
Figure 2 is a horizontal section of the same.

A is the box, which may be made of any suitable material, with compartments B, one for each bottle, which are represented by C.

D represents openings in the side of the box, one for each compartment.

E is the cover closing over the box to the bottom, and made to turn freely on the box.

It is also provided with openings in the side, as at F, which, when the cover is turned to the right position, will coincide with the holes in the box, and expose the labels on the bottles to view, whereby the purchaser may assure himself of the contents without raising each bottle out of the compartment and the packing around it, as it is necessary to do as the boxes are at present arranged.

Pictures H, or ornamental designs, may be placed on the parts of the box exposed to view through the holes in the cover, when it is turned to close the holes in the sides of the box.

Having thus described my invention,

I claim as new and desire to secure by Letters Patent—

A packing-case for perfumery and other toilet-articles, formed by the combination of a box, A, provided with compartments B and openings D, with the cover E, provided with similar openings, arranged to operate substantially as shown and described.

The above specification of my invention signed by me this 13th day of December, 1869.

THOS. P. SPENCER.

Witnesses:
GEO. W. MABEE,
ALEX. F. ROBERTS.